Patented Dec. 31, 1935

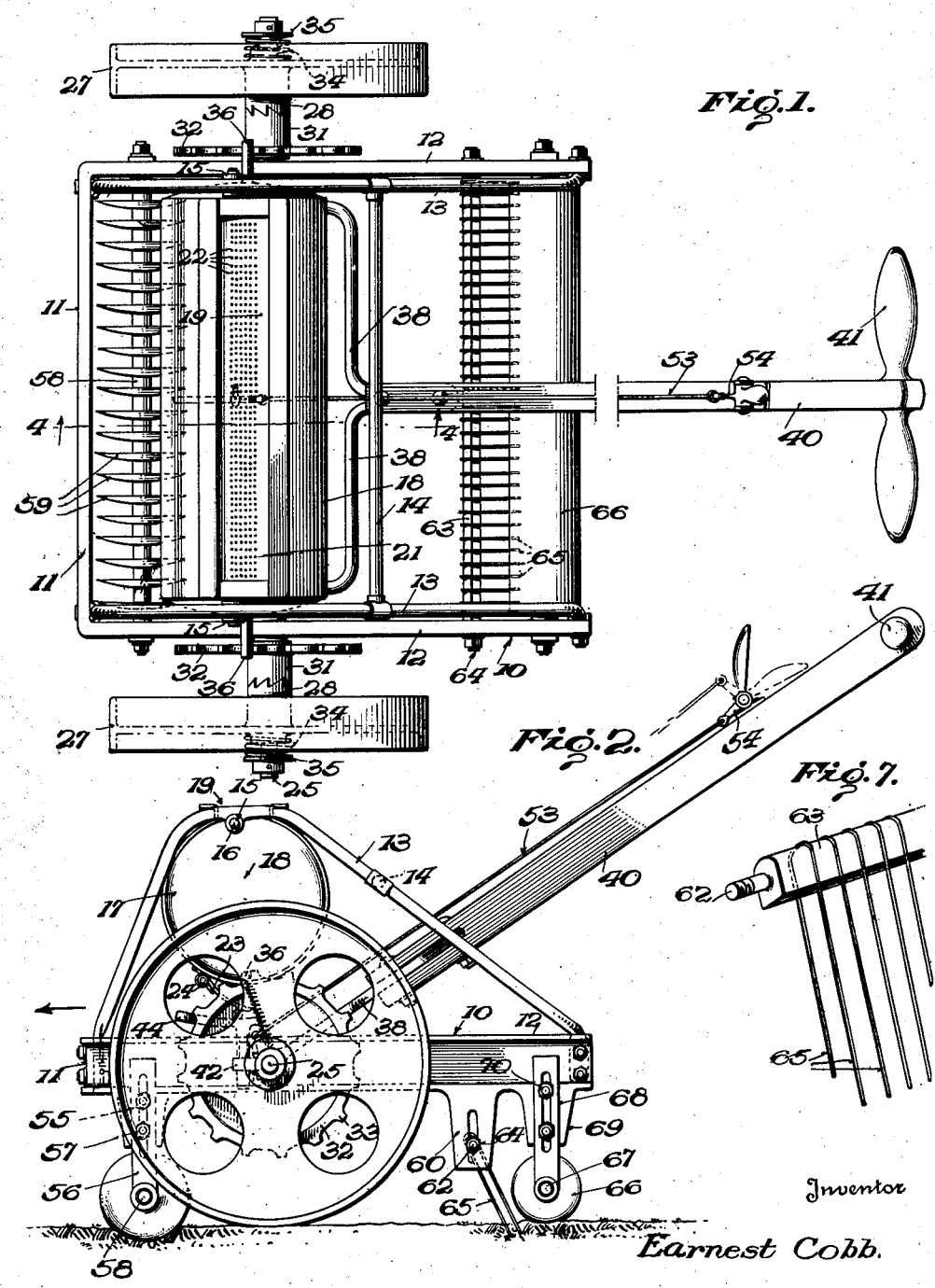

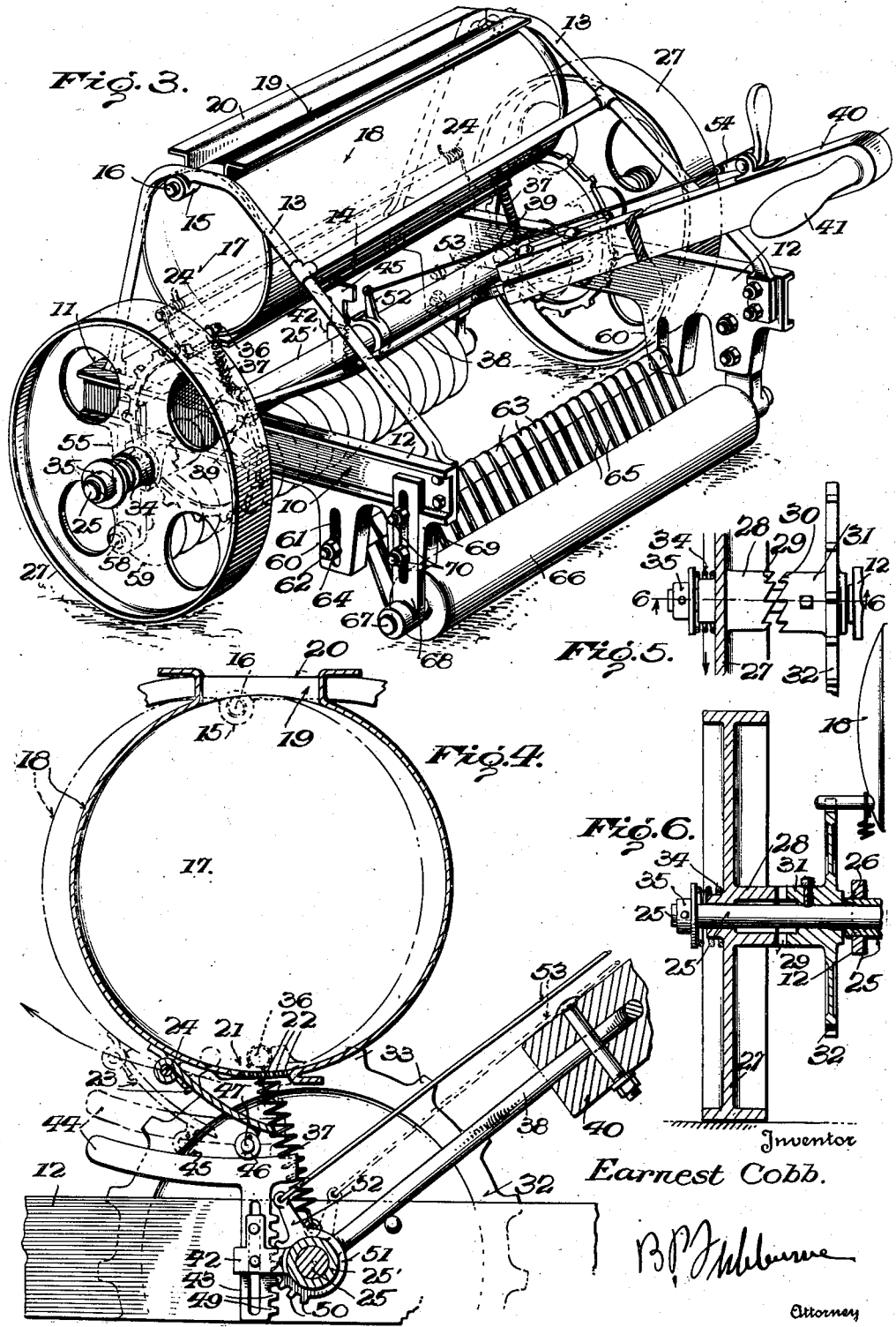

2,026,460

UNITED STATES PATENT OFFICE 2,026,460

MACHINE FOR SOWING TOBACCO SEED OR THE LIKE

Earnest Cobb, Pinetops, N. C.

Application February 18, 1935, Serial No. 7,136

8 Claims. (Cl. 275—2)

My invention relates to machines for sowing seed.

An important object of the invention is to provide a machine of the above mentioned character which is adapted to sow fine seed, such as tobacco seed.

A further object of the invention is to provide a machine of the above mentioned character which is adapted to be manually operated and may be conveniently manipulated by a single operator.

A further object of the invention is to provide a machine of the above mentioned character which is adapted to produce furrows in the ground, sow the seed upon the ground thus treated, rake and cover the seed thus sown, and finally roll the ground to complete the planting operation.

A further object of the invention is to provide simple and reliable means for vibrating the hopper to cause the seed to be sown upon the ground, with means for controlling such sowing operation, at the will of the operator.

Other objects and advantages of the invention will be apparent during the course of the following description.

In the accompanying drawings forming a part of this application and in which like numerals are employed to designate like parts throughout the same, Figure 1 is a plan view of a machine embodying my invention, Figure 2 is a side elevation of the same, Figure 3 is a perspective view of the machine, Figure 4 is an enlarged longitudinal section taken on line 4—4 of Figure 1, parts broken away, Figure 5 is a side elevation of a clutch device, Figure 6 is a detailed section taken on line 6—6 of Figure 5, and, Figure 7 is a perspective view of the rake bar.

In the drawings, wherein for the purpose of illustration is shown a preferred embodiment of my invention, the numeral 10 designates a horizontal frame, which is preferably generally U-shaped and having its closed end 11 arranged foremost. This frame includes sides 12, as shown. A supporting structure is arranged upon the frame 10 and projects upwardly above the same and includes inverted generally V-shaped supports 13, rigidly attached at their forward ends to the frame end 11 and at their rear ends to the sides 12. These supports may be provided with a horizontal connecting rod 14, if desired. At their upper ends or apexes, the supports 13 are provided with bearings 15 pivotally receiving trunnions 16, which are rigidly attached to the ends 17 of a preferably cylindrical vibratory hopper 18. The trunnions are arranged near the periphery of the ends 17 and are eccentric or to one side of the central longitudinal axis of a longitudinal opening or slot 19, formed in the upper portion of the hopper, and having a flange or mouth 20, as shown. It is thus seen that the hopper is pivotally supported near its upper portion and is free to vibrate in a vertical plane in a direction longitudinally of the frame 10. In its bottom or lower portion the hopper 18 has its periphery provided with a longitudinal section 21, extending throughout its entire length, and this section is foraminous and has apertures 22 through which the tobacco seed may pass when the hopper is vibrating. The foraminous portion 21 may be formed of a woven wire fabric, if desired.

Arranged outwardly of and beneath the foraminous portion 21 is a pivoted valve element or cover 23, which is connected at its forward edge with the hopper 18 by a spring hinge 24 acting to swing the cover 23 from the foraminous portion 21. Means are provided, to be described, to shift the cover 23 upwardly or inwardly in close relation to the foraminous portion 21 to thereby close the apertures 22, in whole or in part.

Extending transversely of the frame 10, at a point spaced from the forward and rear ends of the frame is a stationary bearing sleeve 25', rigidly secured in openings in the sides 12. An axle 25 is journalled in sleeve 25'. This axle has traction wheels 27, rotatable thereon, and these traction wheels have hubs 28, as shown. Each hub 28 is provided at its inner end with ratchet teeth 29, to engage with ratchet teeth 30, formed on a hub 31, rigidly mounted upon the axle 25. This hub is formed integral with a vibrating wheel 32, having spaced teeth 33, as shown. The hub 28 is urged inwardly toward the hub 31 by a compressible coil spring 34, held upon the axle by means of a nut 35. The hubs 28 and 31 form an over-running clutch for each traction wheel. As the machine is moving forwardly in a straight line, the spring 34 holds the ratchet teeth 29 and 30 into engagement so that hubs 28 and 31 at each traction wheel, turn as a unit, but when the machine is turned around, at the end of the row, the hub 28 of the outer traction wheel will then overrun the hub 31, thereby effecting a differential action between the traction wheels. The invention is not restricted to this differential action as satisfactory results may be obtained by having one traction wheel rigid upon the axle and the other rotatable, or both rigid upon the axle.

The trunnions 16 are disposed in advance of the axle 26, and the hopper 18 is provided at its ends 17 and near its lower portion, with tripping lugs or trunnions 36, rigidly secured thereto, arranged to operate upon the vibrating wheels 32 and to be engaged by the teeth 33. Retractile coil springs 37 have their upper ends attached to the tripping trunnion 36 and their lower ends attached to the sleeve 25. The function of these springs is to swing the hopper 17 rearwardly upon its pivot 16 when shifted forwardly therefrom.

The numeral 38 designates a U-shaped bail, having knuckles 39 at its forward ends which are pivotally mounted upon the bearing sleeve 25'. This bail is rigidly attached to a rearwardly projecting handle 40, having a transverse handgrip 41. The stationary sleeve 25' has a yoke 42 rigidly secured thereto and this yoke slidably receives and guides a vertical reciprocatory rack bar 43, provided at its upper end with a curved shoe 44. The upper face 45 of this shoe is concentric with the pivots or trunnions 16 and this face is adapted to engage a roller 46, carried by a shank 47, rigidly attached to the cover or valve element 23. The teeth 49 of the rack 43 are engaged with the teeth 50 of a gear 51, arranged within the yoke 42 and rotatable upon the sleeve 25', and this gear has an upstanding crank 52, pivotally connected with a rod 53, extending rearwardly and pivotally connected with a bell-crank lever 54, which is pivotally mounted upon the rear portion of the handle 40. It is thus seen that by swinging the bell-crank lever 54 rearwardly, the rack 43 will be raised and shoe 44 will engage roller 46 and cover 23 will be brought over apertures 22 to completely or partly cover or close the same, and the opening or closing movement of cover 23 is not affected by the vibratory movement of the hopper 18, roller 46 travelling upon the shoe 44, during this vibratory movement.

Rigidly secured to the side portions 12, are depending vertical grooved brackets 55, receiving vertically adjustable shanks 56 adapted to be clamped thereto in selected adjusted positions by bolts 57 or the like. The shanks 56 carry at their lower ends a transverse shaft 58, upon which are mounted spaced plow disks 59 of any well known or preferred construction. These spaced plow disks are adapted to form the furrows in the ground. The plow disks 59 are arranged in advance of the foraminous portion 21 of the vibrating hopper and will therefore form the furrows before the seed is shaken upon the ground. Disposed at the rear of the hopper 18, and preferably at the rear of the traction wheels 27, are depending brackets 60, having elongated slots 61, to receive reduced cylindrical ends 62 of a rake bar 63, and carrying nuts 64 so that the rake bar may be clamped to the brackets 60 and vertically adjusted or angularly adjusted, as desired. The rake bar is included in a rake embodying tines 65, each of which is preferably U-shaped, and extending over the bar 63 and secured thereto by spot welding or the like.

At the rear of the rake is a covering and packing roller or cylinder 66, carried by a shaft 67, in turn rotatably mounted upon vertical adjustable shanks 68, which are slidably mounted within depending grooved brackets 69. These brackets are rigidly secured to the sides 12 and the shanks 68 may be clamped to the brackets by bolts 70 or the like.

The operation of the machine is as follows:

With the cover 23 in the open position, as shown in the drawings, the operator grasps the handgrip 41 and pushes the machine forwardly over the ground. The plow disks 59 form the furrows in the ground, and the seed is sifted or sown in a broadcast manner over the furrowed ground due to the vibratory action of the hopper 18, which is swung upon its pivots 16 longitudinally of the frame 10. As each tooth 33 is brought into engagement with the vibratory trunnion 36, the hopper 18 is swung forwardly upon its pivots, until the trunnion clears the engaging tooth, at which time the trunnion trips readily over the tooth, and the springs 37 rapidly throw the hopper 18 rearwardly, bringing the trunnion 36 into engagement with the next advancing tooth 33. In this manner the hopper is vibrated, as stated, and the vibration comprises a forward swinging movement which is relatively slow and a rapid rearward swinging movement, and a quick stopping action when the trunnion engages the next advancing tooth 33. By this means, the seed is sifted through the foraminous portion 21. The rake next engages the ground and rakes it and covers the sown seed and the roller 66 following the rake, completes the covering action and packs the ground.

It is to be understood that the form of my invention herewith shown and described is to be taken as a preferred example of the same and that various changes in the size, shape and arrangement of parts may be resorted to without departing from the spirit of my invention or the scope of the subjoined claims.

Having thus described my invention, I claim:

1. A machine for sowing tobacco seed or the like, comprising a support, wheels carrying the support, a hopper pivotally mounted upon the support and having a foraminous portion, for the discharge of the seed, an operating element secured to the hopper, a toothed wheel driven by one of the first named wheels and arranged to engage the operating element, a spring to swing the hopper in one direction, a movable cover arranged near the foraminous portion to be shifted toward the foraminous portion, and means operating independently of the swinging movement of the hopper to shift the cover with relation to the foraminous portion.

2. A machine for sowing tobacco seed or the like, comprising a support, wheels carrying the support, a hopper pivotally mounted near its upper portion upon the support to swing in a direction longitudinally of the support and provided near its bottom with a foraminous portion, a trunnion secured to the hopper near its bottom, a toothed wheel connected with one of the first named wheels and arranged to engage the trunnion, a spring to swing the hopper in one direction, a cover pivotally connected with the lower portion of the hopper and adapted to be shifted toward the foraminous portion, and means to shift the cover upon its pivot, such means operating independently of the swinging movement of the hopper.

3. A machine for sowing tobacco seed or the like, comprising a wheeled support, a hopper having a foraminous portion, means to pivotally connect the hopper with the support, means to swing the hopper upon its pivot means, a cover pivotally connected with the hopper and movable toward the foraminous portion, a roller secured to the cover to move it, a shoe having a curved face which is concentric with the hopper pivot means and engaging the roller, and means to move the shoe toward the hopper.

4. A machine for sowing tobacco seed or the like, comprising a support, wheels carrying the support, a hopper pivotally mounted upon the support to swing in a direction longitudinally of the travel of the support and provided near its bottom with a foraminous portion, means to swing the hopper upon its pivot, a cover pivotally connected with the lower portion of the hopper and adapted to be shifted toward the foraminous portion, and means to shift the cover upon its pivot to a selected position and hold the same in such selected position, such means operating independently of the swinging movement of the hopper.

5. A machine for sowing tobacco seed or the like, comprising a wheeled frame, a handle connected with the wheeled frame, a vibratory hopper mounted upon the wheeled frame and having a foraminous portion near its bottom through which the seed passes, means to vibrate the hopper, a movable cover mounted upon the hopper near the foraminous portion and adapted to be shifted toward the foraminous portion, and means mounted upon the wheeled frame and operating independently of the vibration of the hopper to shift the cover toward the foraminous portion during such vibration and hold the same in the shifted position, such means including a manually operated part connected with the handle.

6. A machine for sowing tobacco seed or the like, comprising a wheeled support, a vibratory hopper mounted upon the wheeled support and having a foraminous portion arranged near its bottom, means to vibrate the hopper, a cover arranged near and beneath the foraminous portion and pivotally connected near one edge to the hopper so that its opposite edge may be swung toward the foraminous portion, and means mounted upon the wheeled support and adapted to be stationary with respect to the wheeled support during the vibration of the hopper and adjustable to shift the cover during such vibration toward the foraminous portion and hold the cover in the shifted position.

7. A machine for sowing tobacco seed or the like, comprising a wheeled support, a vibratory hopper mounted upon the support and provided with means for discharging the seed, means for vibrating the hopper, a cover arranged near the seed discharge means and movable toward the same, and means mounted upon the wheeled support and adapted to be stationary with relation to the support during the vibration of the hopper and adjustable to shift the cover toward the seed discharging means during such vibration and to hold the cover in the shifted position.

8. A machine for sowing tobacco seed or the like, comprising a wheeled support, a vibratory hopper mounted upon the support and provided with means for discharging the seed, means to vibrate the hopper, a cover mounted upon the hopper to vibrate therewith and arranged near the seed discharge means and movable toward the same, and means mounted upon the wheeled support and adapted to be stationary with relation to the support during the vibration of the hopper and adjustable to shift the cover toward the seed discharging means during such vibration and to hold the cover in the shifted position.

EARNEST COBB.